(12) United States Patent
Neubacher et al.

(10) Patent No.: US 7,890,481 B2
(45) Date of Patent: Feb. 15, 2011

(54) SYSTEM AND METHOD FOR MANAGING BINARY LARGE OBJECTS

(75) Inventors: Andreas Neubacher, Vienna (AT); Csaba Ladonyi, Vienna (AT); Miklos Papai, Budapest (HU)

(73) Assignee: Nuance Communications Austria GmbH, Vienna (AT)

( * ) Notice: Subject to any disclaimer, the term of this patent is extended or adjusted under 35 U.S.C. 154(b) by 780 days.

(21) Appl. No.: 11/721,369

(22) PCT Filed: Dec. 9, 2005

(86) PCT No.: PCT/IB2005/054158
§ 371 (c)(1),
(2), (4) Date: Jun. 11, 2007

(87) PCT Pub. No.: WO2006/064436
PCT Pub. Date: Jun. 22, 2006

(65) Prior Publication Data
US 2009/0276456 A1   Nov. 5, 2009

(30) Foreign Application Priority Data
Dec. 15, 2004   (EP) .................................. 04106603

(51) Int. Cl.
*G06F 17/30* (2006.01)
(52) U.S. Cl. ..................................................... 707/703
(58) Field of Classification Search ........................ None
See application file for complete search history.

(56) References Cited

U.S. PATENT DOCUMENTS

| 6,029,160 | A | 2/2000 | Cabrera |
| 6,564,215 | B1 | 5/2003 | Hsiao |
| 6,615,219 | B1* | 9/2003 | Bruso et al. .................. 707/102 |
| 2002/0095433 | A1* | 7/2002 | Inohara et al. .............. 707/200 |
| 2005/0119988 | A1* | 6/2005 | Buch et al. ..................... 707/1 |
| 2005/0160432 | A1* | 7/2005 | Gallagher et al. ........... 719/313 |
| 2006/0101067 | A1* | 5/2006 | Kilian-Kehr et al. .... 707/103 R |

FOREIGN PATENT DOCUMENTS

WO   0148638 A2   7/2001

OTHER PUBLICATIONS

Shapiro M. et al "Managing Databases with Binary Large Objects" 16th IEE Symposium on Mass Storage Systems, p. 185-193, 1999.
Stonebraker M. et al "Large Object Support in POSTGRES" Proceedings Ninth International Conf. on Data Engineering, pp. 355-362, 1993.
Mittal N. et al "Database Managed External File Update" Proceedings 17th International Conf. on Data Engineering, pp. 557-564, Apr. 2001.

* cited by examiner

*Primary Examiner*—Neveen Abel Jalil
*Assistant Examiner*—Kevin Young
(74) *Attorney, Agent, or Firm*—Sunstein Kann Murphy & Timbers LLP (57) ABSTRACT

The invention regards a system (10) and method for managing BLOBs. The system combines a file subsystem (20) and a database subsystem (30), wherein the database subsystem (30) comprises relations between file names of files (40) comprising a BLOB (50) and BLOB names. In the event of modification of a file (40) containing a BLOB (50), a new file, having a new file name, is created, where a relation between the new file name and the BLOB name is created within a database transaction in the database subsystem (30). By thus extending the ACID-properties of database transactions to files, it is ensured that operations on BLOBs in the system (10) meet the ACID-requirements while keeping the efficiency of operations on files.

8 Claims, 4 Drawing Sheets

SYSTEM AND METHOD FOR MANAGING BINARY LARGE OBJECTS

FIELD OF THE INVENTION

This invention relates to a system for managing Binary Large Objects (BLOBs), comprising a file subsystem arranged to create, store, modify and/or delete files, wherein said system is arranged for including a specified BLOB associated with a BLOB name in a specified file in said file subsystem. The invention moreover relates to methods of creating, modifying and deleting, respectively, a specified file including a specified Binary Large Objects (BLOBs) in a system, which system comprises a file subsystem arranged to create, store, modify and/or delete files, said specified BLOB having a BLOB name.

BACKGROUND OF THE INVENTION

There are applications that need to process large amounts of data, i.e. several hundreds of MBs, stored in the form of binary large objects (BLOBs). Typically the data relates to (medical) images, sound, movies, and multi-media files. When one or more such BLOBs are to be modified, the well-known ACID (atomicity, consistency, isolation, durability) requirements must be fulfilled:

- Atomicity: Either all data in all involved BLOBs is modified or no changes are done. It must never happen that only some of the modifications are applied. If this cannot be guaranteed, the resulting mix of modified and unmodified data may be unusable.
- Consistency: It must be possible to simultaneously modify multiple BLOBs. If this cannot be guaranteed, there would frequently be times, where some BLOBs have been modified and others are still waiting for modification; such a mix of data may be unusable.
- Isolation: Two programs must not modify the same BLOB or overlapping sets of BLOBs at the same time. If this cannot be guaranteed, the resulting mix of data from different modifications may be unusable.
- Durability: When the modifications are completed, they must be stored on disk (not just in a cache memory) so that the modifications are not lost if the storage system or the computer stop working afterwards. If this cannot be guaranteed, the user may believe the modifications have been made, when they are actually not saved.

It should be possible to fulfil this requirement based on common off-the-shelf (COTS) software, i.e. standard file system and database software, using well-known application programming interfaces such as Posix file system functions and SQL statements for database operations.

Moreover, an additional requirement is that the identity of a file in a file system must be preserved, i.e. it must not be lost. For example, if a backup of a file is made, the file is modified and then the backup should be restored. In this case it must be possible from just looking at the file names in the backup and in the file system, which file on backup is related to the modified file.

In standard file systems, such as DOS FAT, NTFS, Linux ext2, etc. simple operations such as "create a file", "update the contents of a file", "rename a file", "delete a file" are possible. These are not sufficient to fulfil the ACID-requirements. Journaling file systems, such as e.g. NTFS in certain configurations or Linux ReiserFS, fulfil the ACID-requirements for single files, but not for sets of files. Moreover, even though file systems typically are capable of storing BLOBs, transactions on BLOBs are typically not supported. It has been suggested to simply store BLOBs in a file system and do without transactions on the BLOBs.

Standard database systems, such as MS SQLserver or Oracle, typically provide functionality for fulfilling the ACID-requirements, but they are not optimized for operating on sets of large files. It is well-known that performance in standard database systems becomes a problem with large data sized. Most standard databases provide some support for transactions involving BLOBs that can have sizes of up to tens or hundreds of MB, but they are not optimized for transactions involving hundreds of MB. This usually makes the standard databases unusable for managing BLOBs.

OBJECT AND SUMMARY OF THE INVENTION

It is therefore an object of the invention to provide a system for managing binary large objects (BLOBs), which system should comply with the above mentioned ACID requirements and the requirement of preservation of a file identity.

This object is achieved, when the system of the introductory paragraph is characterized in that said system moreover comprises a database subsystem, and that said system is arranged to generate a file name to be associated with said specified file, wherein said database subsystem is arranged to create a relation between of said file name and said BLOB name.

Hereby, the functionalities of a file subsystem and a database subsystem are combined so that the functionalities of the file subsystem can be used for e.g. creating, storing, modifying and/or deleting files, whereas the functionalities of the database subsystem can be used for keeping track of which file in the file subsystem is related to a specified BLOB. Thus, the system according to the invention alleviates the problems stated above by proposing a way of applying database transactions to files.

Within the system, any BLOB name and file name should be unique, and the relation between a file name and the BLOB name of the associated BLOB should be bijective, so that any unique file name is associated with one unique BLOB name and any unique BLOB name is associated with one unique file name. It should be noted that the expressions "a file name is associated with a BLOB name" and "a file name is combined with a BLOB name" are synonymous with the expression "a file name is related to a BLOB name" and "a relation exist between a file name and a BLOB name".

In the above, it should be understood that said relation and/or any relevant information regarding file name and/or BLOB name are to be accessible by relevant components in the system.

Preferably, the database subsystem is arranged to store, modify, rename and/or delete said relation between said file name and said BLOB name. Hereby, the relations in the database subsystem can be changed according to changes to BLOBs included in files in the file subsystem.

In a preferred embodiment of the system said relation is comprised in a table in said database subsystem, which table is arranged to comprise relations between said BLOB name and said file name for each file including a BLOB. Hereby, an easily realizable way of keeping track of the relations between BLOB names and file names is achieved.

Preferably, the system further comprises a controller arranged to control processing of the system. The controller could be integrated in the file subsystem, the database subsystem or it could be a separate component. The controller could be any data processing component arranged for controlling initiation of operations performed in the file subsystem and the database subsystem. Moreover, the controller should be arranged to control communication or information exchange between the controller and the file subsystem and/or the database subsystem or communication or information exchange between the file subsystem and the database subsystem.

Preferably, said file name comprises a globally unique identifier (GUID) and a version index. Thus, if the version index is dynamic (i.e. changed) and the GUID is static (i.e. not changed) upon modifications of a BLOB, such a file name will provide a way of preserving the identity of the file comprising the BLOB, whilst keeping track of any modifications of the file. Hereby, the identity and the history of each file is visible in the system (by means of the file subsystem) and in backups, even though new file names are created each time a BLOB is modified/updated. This feature alleviates the disadvantages from creating completely new file names (i.e. new file names with nothing in common with the old file names) for each modification of a BLOB and retains most of the advantages of a file name preserving solution.

In yet a preferred embodiment, said system is arranged to, upon modification of a specified BLOB, create a new file including the modified specified BLOB and having a new file name, and to associate the BLOB name with the new file name in the database subsystem. The combination of creating a new file and associating the BLOB name with the new file name in the database subsystem guarantees, that changes to a BLOB can be undone (which is called "rolled back" in database terminology) until they are committed and that the BLOB stays consistent in case of a failure of the system during updating the BLOB, in that either the old file (i.e. the unmodified file) is in the file subsystem and the BLOB is associated with the old file, or the new file (i.e. the modified file) is in the file subsystem and the BLOB is associated with the new file. Thus, this system is superior to file systems in which file names are preserved during modifications.

Preferably, the said new file name comprises said globally unique identifier (GUID) and an updated version index. Again, a new file name thus created will provide a way of preserving the identity of the file comprising the BLOB, whilst keeping track of any modifications of the file, in that the version index is updated.

The invention moreover relates to methods as mentioned in the opening paragraph, comprising features corresponding to the features of the system and thus having corresponding advantages. However, in a preferred embodiment of the method of creating a specified file, a step of generating a file name comprises the steps of generating a GUID and a version index for the BLOB; and combining said GUID and said version index to a file name for a specified file comprising said BLOB. Hereby, an easy way of generating file names is achieved. Typically, the GUID) constitutes an unchanging part of the file name and the version index constitutes a part, which can be changed every time the specified is updated/modified/changed.

In yet a preferred embodiment of the method of creating a specified file according to the invention, it further comprises the steps of: starting a database transaction in said database subsystem, wherein said database transaction comprises the step of combining said file name and said BLOB name; checking if the steps of generating a file name, of combining said file name and said BLOB name and of writing the BLOB to said specified file, were successful; and only if the previous steps were successful, committing the database transaction. The above steps form together with the generation of a file name described in the preceding paragraph a system transaction consisting of the steps of generating a file name, combining said file name and said BLOB name and writing the BLOB to the file in the file subsystem. By starting a database transaction and only committing it in case of success, it is ensured that the ACID requirements are met.

The method of modifying a specified BLOB comprises the steps of starting a database transaction in a database subsystem, that is part of the system; retrieving the file name for a specified file comprising said specified BLOB; creating a new file name; combining the new file name and the BLOB name; modifying the specified BLOB and writing the modified specified BLOB to a new file in the file subsystem, where said new file is associated with said new file name; checking if all previous steps were successful; and if the check shows that the previous steps were successful, committing said database transaction. Hereby, it is assured that the ACID requirements are met during update/modification of a BLOB in the system.

The method of deleting a specified BLOB having a BLOB name with a relation to a file name in said database subsystem, where a relation exists between said BLOB name and a file name in a database subsystem, comprises the steps of: starting a database transaction in said database subsystem; in said database subsystem, deleting the relation between said BLOB name and said file name; committing the database transaction, if the previous steps were successful; and in said file subsystem, deleting said existing file including said specified BLOB, if the previous steps were successful. In the above case a system transaction consists of the steps of deleting the relation between the BLOB name and the file name in the database subsystem, and deleting the existing file in the file subsystem, only if deleting said relation was successful. Again, by starting and committing a database transaction and only deleting the file in case of success of the database transaction steps, it is ensured that the ACID requirements are met.

It should be noted that throughout this specification the term "BLOB" (Binary Large Object) is meant to cover any data object that due to its size cannot be handled efficiently by the database system. The size of a BLOB could be any size in the range between a few hundred kB and thousands of MB of data. The size of a BLOB typically lies in the range between some tens and some hundreds of MB of data; however, the size of a BLOB is not limited to this range.

Figure 2:
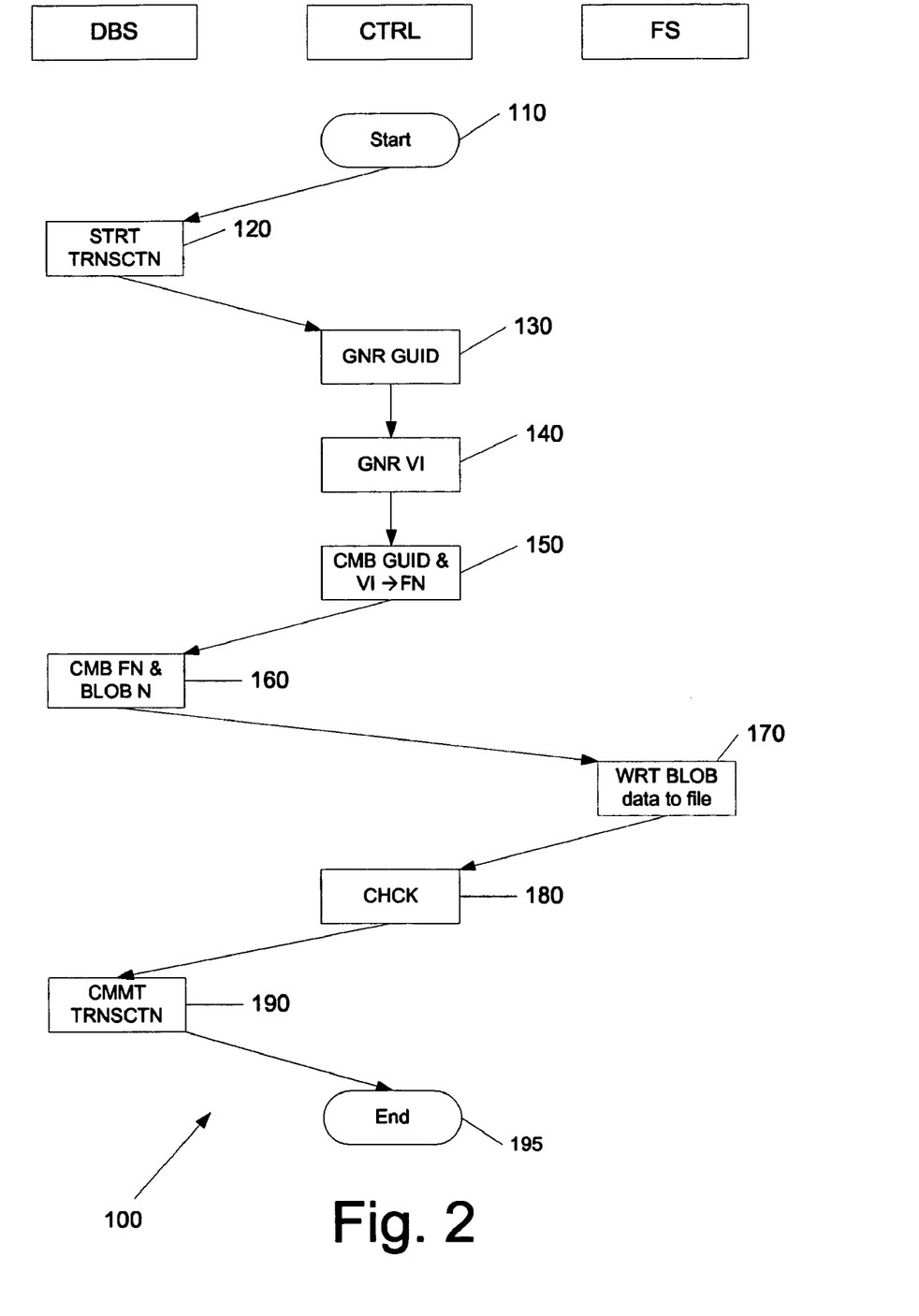
FIG. 2 is a flow chart of a method according to the invention during creation of a new file.
Figure 3:
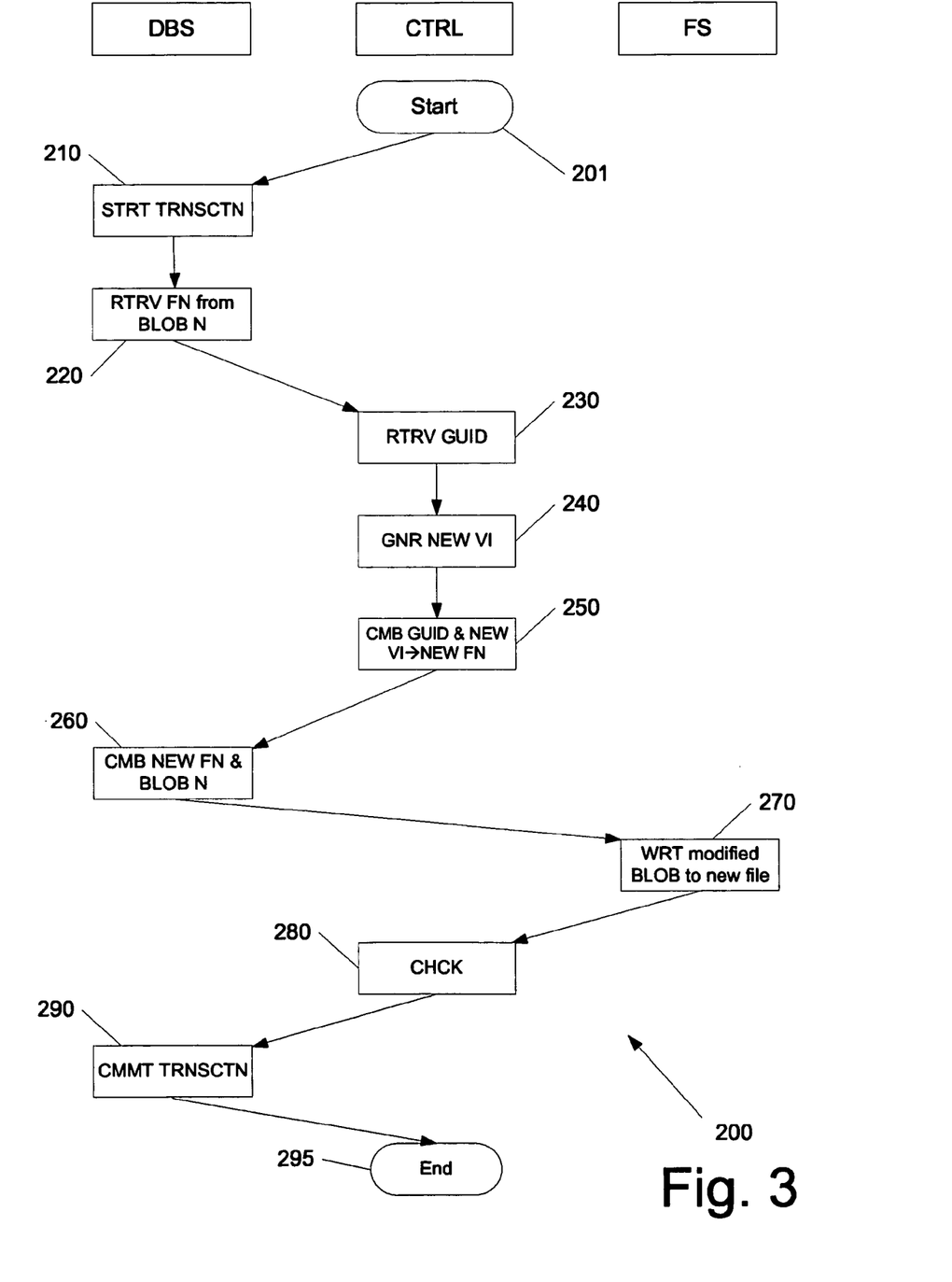
FIG. 3 is a flow chart of a method according to the invention during updating/modification of an existing file.
Figure 4:
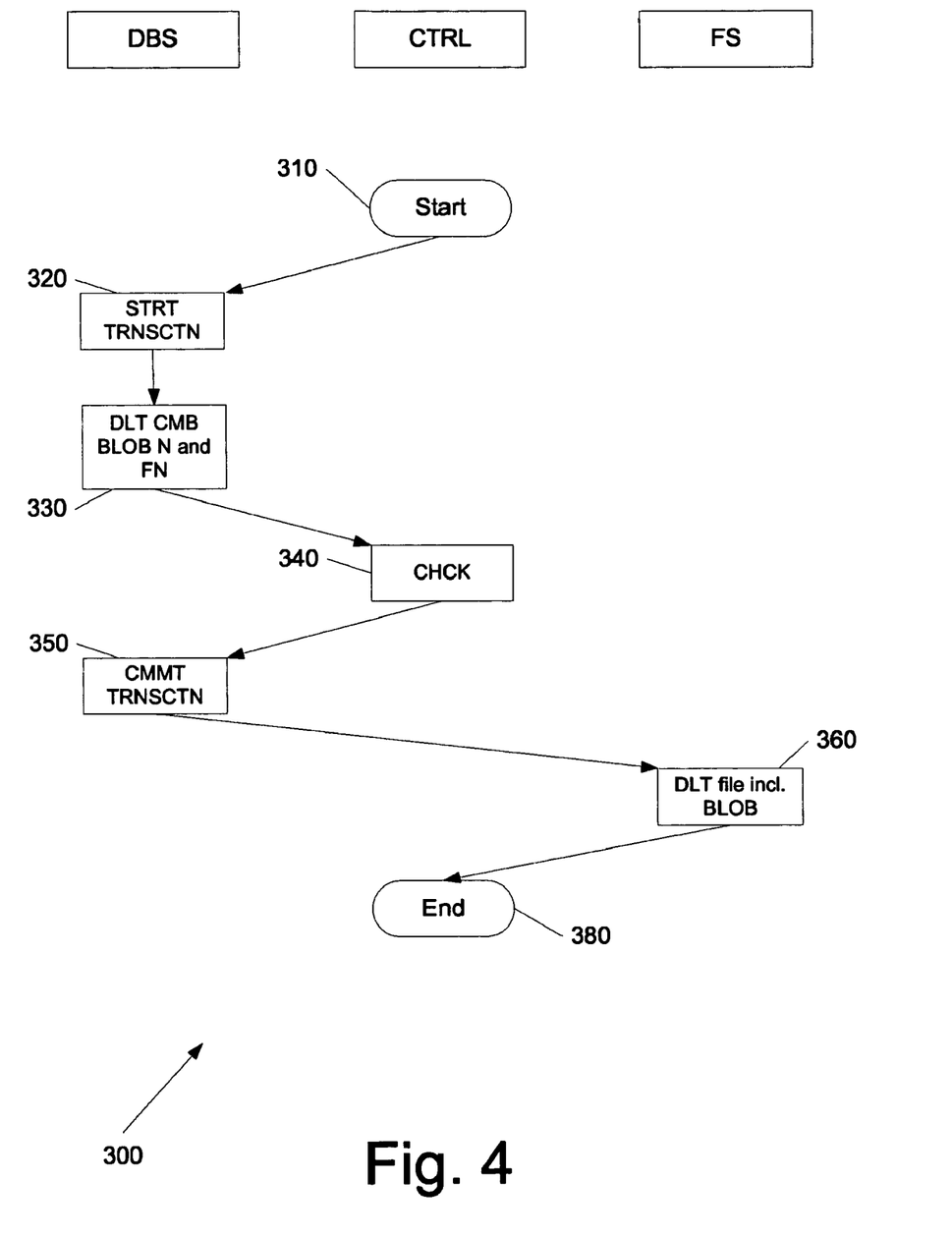
FIG. 4 is a flow chart of a method according to the invention during deletion of an existing file.

The term "database transaction" is meant to cover a sequence of information exchange and related work (such as database updating) that is treated as a unit in the database subsystem for ensuring data integrity within the system. For a database transaction to be completed and data changes to be made permanent, the database transaction has to be completed in its entirety. In the database subsystem and in case of a database transaction being completed successfully, the database changes are said to be committed; when a database transaction does not complete, the changes are rolled back. Moreover, the term "system transaction" is meant to cover a transaction performed in the system and typically (but not necessarily) by use of both the database subsystem and the file subsystem. Each of the methods shown in FIGS. 2-4 is an example of such a system transaction, consisting of all the method steps between the steps "start" and "end".

Moreover, it should be noted that the term "manage a file" is meant to cover any standard transaction or operation performed on files, e.g. creating a new file, deleting an existing file, updating/modifying an existing file and/or renaming an existing file. Finally, it should be noted that the term "file" is meant to cover a file in the file subsystem comprising all data for a certain BLOB (being equivalent to the BLOB being included in the file).

The file subsystem and the database subsystem, respectively, could be any appropriate standard file system and database system, respectively, arranged for exchange of information regarding file names and BLOB names.

It should be understood, that within the file subsystem and the database subsystem, respectively, all file names and BLOB names, respectively, should be unique.

BRIEF DESCRIPTION OF THE DRAWINGS

The invention will be explained more fully below in connection with an example of a preferred embodiment and with reference to the drawing, in which.

DESCRIPTION OF PREFERRED EMBODIMENTS

Figure 1:
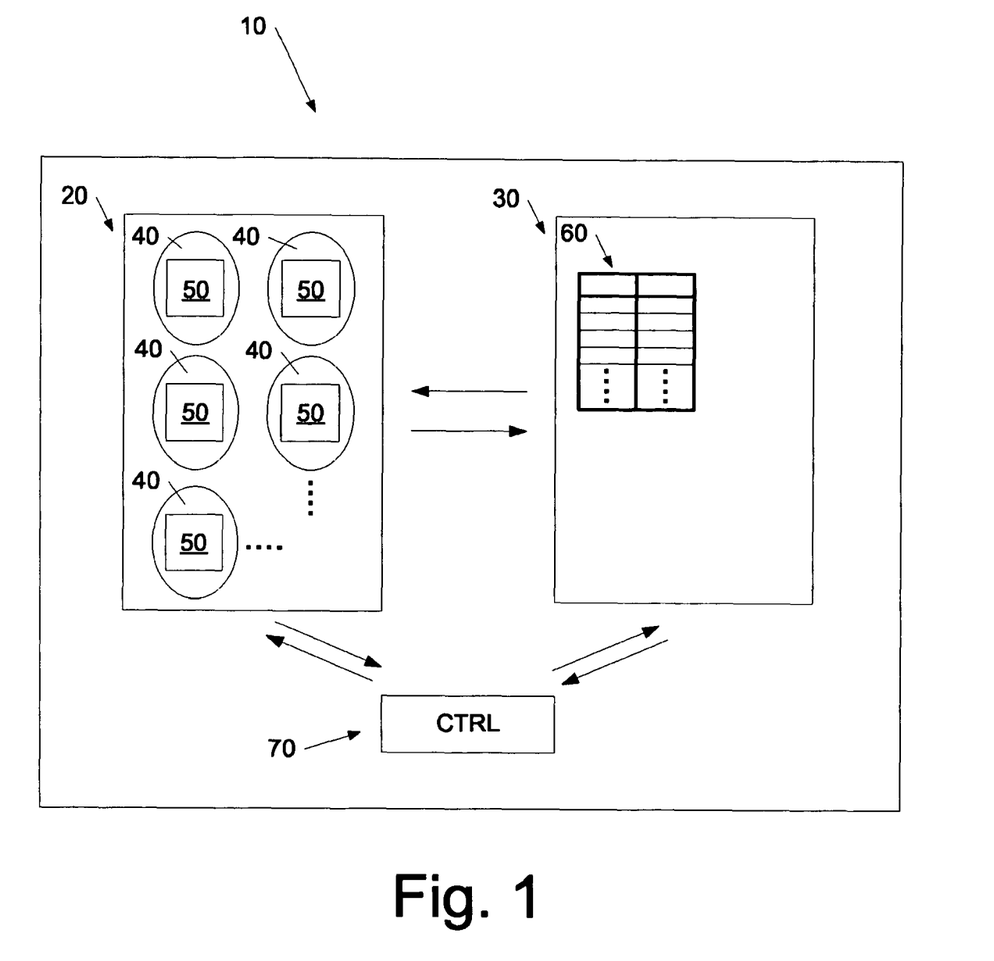
FIG. 1 is a very schematic representation of the system according to the invention.

FIG. 1 is a very schematic representation of the system 10 according to the invention. The system 10 comprises a file subsystem 20, a database subsystem 30 and a controller 70. In the file subsystem 20, a plurality of files 40 is shown, each having a file name (not shown). In FIG. 1 each file 40 comprises a BLOB 50, each of which has a BLOB name (not shown). The database subsystem 30 comprises a table 60 with two columns. One column of the table 60 could contain the BLOB names and the other could contain the file names.

The controller 70 is a data processing component in the system 10 controlling initiation of operations performed in the file subsystem 20 and the database subsystem 30. Moreover, the controller 70 is arranged to control communication or information exchange between the controller 70 and the file subsystem 20 and/or the database subsystem 30 (which is shown by the slanting arrows).

The horizontal arrows between the file subsystem 20 and the database subsystem indicate possible communications or information exchanges. Thus, the horizontal arrow pointing from the file subsystem 20 towards the database subsystem 30 indicates, that the name of any file comprising a BLOB is transferred from the file subsystem 20 to the database subsystem 30, whilst the horizontal arrow pointing from the database subsystem 30 towards the file subsystem 20 indicates, that a file name and an associated BLOB name is transferred from the database subsystem 30 to the file subsystem 20. These information exchanges could be initiated by means of the controller 70.

The file name of each file 40 could be a combination of a GUID and a version index. A GUID is an identifier that is unique within a certain context. Here, the context encompasses all BLOBs managed by the system and method of the invention. In one embodiment of the system (and method), a GUID counter stored in the database could be used, where the GUID counter is incremented each time a new GUID is required. The new value of the counter is used as the GUID. However, algorithms for creating GUIDS are well-known and do not form part of the present invention. In one embodiment of the system (and method) of the invention a counter stored in the database and which is incremented each time a new version index is required, is used for providing a version index. The new, incremented value of the counter is used as the new version index. Alternatively, it is conceivable that a hash value (using any appropriate well-known algorithm for computing hash values such as e.g. MD5) computed from the new BLOB data is used as the new version index.

An example of a file name constituted by a GUID and a version index could be "123_456", where the number to the left of the "_", i.e. "123" is the GUID and the number to the right of the "_", i.e. "456" is the version index. It should be noted that the combination of a GUID and a version index must be bijective, i.e. the following requirements must be met:

Different file names (i.e. different pairs of GUID and version index) must always result in different file names, and For any given file name, it must be possible to retrieve the GUID and the version index.

As noted above, it is possible to use a single table 60 in the database subsystem 30 for all BLOBs, where the table comprises a column for the BLOB names and a column for the file names. The table structure in the database subsystem 30 could be any table structure, wherein:

It is possible to retrieve the file name of the file including the BLOB, from the BLOB name. The file name may contain the full path to the file including the BLOB or a relative path, if all files are stored below a certain root folder;

It is possible to associate a BLOB name that is not yet present in the database with a file name;

It is possible to modify the file name associated with a BLOB name;

It is possible to delete a pair consisting of a BLOB name and a file name;

It is possible to combine the above operations into a transaction with an SQL-92 isolation level of at least "read committed".

FIGS. 2 to 4 show flow charts of methods according to the invention, where method steps taking place in the database subsystem 30 are drawn underneath a box with the text "DBS", method steps taking place in the file subsystem 20 are drawn underneath a box with the text "FS" and method steps taking place in the controller 70 is drawn underneath a box with the text "CTRL".

FIG. 2 is a flow chart of a method 100 according to the invention during creation of a new file including a BLOB.

The flow is started in the controller 70 in step 110, and continues to step 120, which is performed in the database subsystem 30 (see FIG. 1) and wherein a new database transaction is started. This database transaction is a combination of a file name generated in the steps 130-150 and a BLOB name. After step 120, the flow continues to step 130, wherein a new GUID is generated. In the subsequent step, step 140, a version index is generated and in the subsequent step, step 150, the GUID and the version index are combined to a file name. As mentioned above, an example of a file name constituted by a GUID and a version index could be "123_456", where the number to the left of the "_", i.e. "123" is the GUID and the number to the right of the "_", i.e. "456" is the version index. Moreover, the combination of a GUID and a version index must be bijective, as mentioned above. Even though the steps 130 to 150 in FIG. 2 are shown in the column under the controller CTRL, which means that these steps are performed by the controller, it is also conceivable that these steps could be performed by the database subsystem 30.

Subsequently, the flow continues to step 160, which is performed in the database subsystem 30 (see FIG. 1) and wherein the BLOB name of the BLOB is associated/combined with the file name created in step 150. In the following step, step 170, performed in the file subsystem 20 (see FIG. 1) the data in the BLOB is written to a new file associated with the file name created in the steps 130 to 150.

The method 100 includes a subsequent step, step 180, of checking if all the previous steps were successful. If the check in step 180 has the result that all the previous steps were successful, the database transaction that was started in step 120 is committed in step 190. Thereby, the system transaction, being the generation of a file name, the combination of this file name and a BLOB name, and the writing of BLOB data to a file having the file name in the file subsystem, is committed.

If the check in step 180 indicates that an error has occurred during any of the steps 120 to 170, the database transaction can be rolled back and any file created as part of the system transaction can be deleted. Note, that even if an error occurs during the above deletion of the file, the file subsystem stays consistent with the database subsystem: some unneeded files might be left, but the files in the system still fulfil the ACID properties and the unneeded files do not influence the correct operation of the system. Moreover, they can be deleted at any time. The flow ends in step 195.

FIG. 3 is a flow chart of a method 200 according to the invention during updating/modification of an existing file. The flow starts in step 201. Subsequently, the flow continues to step 210, which is performed in the database subsystem 30 (see FIG. 1) and wherein a new database transaction is started. In the case of the method 200 in FIG. 3 the database transaction is the combination of a new file name and the BLOB name; this database transaction is part of the system transaction comprising the generation of a new file name, relating the new file name to the BLOB name and writing modified data to a new file with the new file name, thus updating/modification of an existing file arranged to include a BLOB.

In the subsequent step, step 220, the file name is retrieved from the BLOB name, e.g. by looking up a table comprising relations between file names and BLOB names in the database subsystem 30. The flow continues in step 230, which is performed in the controller 70 (see FIG. 1). In step 230, the GUID is retrieved from the file name associated with the BLOB name. Thereafter, in step 240, a new version index is generated, and in the following step 250 the GUID extracted from the file name is combined with the new version index generated in step 240 to a new file name. In the example above regarding the file name "123_456", where the number to the left of the "_", i.e. "123" was the GUID and the number to the right of the "_", i.e. "456" was the version index, the new file name might be "123_457", where "457" is the new version index.

In the subsequent step 260, performed in the database subsystem 30 (see FIG. 1), the BLOB name is associated with/related to the new file name created in step 250.

Hereafter, in step 270, in the file subsystem 20 (see FIG. 1), the modified/updated BLOB is written to the file associated with the new file name.

Thereafter the flow continues to step 280, wherein it is checked if all the previous steps were successful. If the check in step 280 has the result that all the steps 210 to 270 were successful, the flow continues to step 290, wherein the database transaction is committed (in the database subsystem 30). Thereby, the system transaction is committed, which as noted above comprises the generation of a new file name, the combination of the new file name and the BLOB name, and the writing of a modified BLOB to a new file with the new file name in the file subsystem.

However, if the check in step 280 indicates that an error has occurred during any of the steps 210 to 270, the database transaction can be rolled back and any file created in the file subsystem as part of the system transaction can be deleted.

If the system transaction was committed, the method could comprise the step (not shown) of deleting the file including the unmodified BLOB, i.e. the file previously associated with the file name having an old version index. However, the method might also include preserving this file including the unmodified BLOB, in the case where it is required to maintain older versions of a file/BLOB.

Note, that even if an error occurs during the above deletion of files in case of rollback of the database transaction, the file subsystem stays consistent with the database subsystem: some unneeded files might be left, but the files in the system still fulfil the ACID properties and the unneeded files do not influence the correct operation of the system. Moreover, they can be deleted at any time.

Due to the structure of the database subsystem, the new file name will not appear in the database subsystem until the database transaction has been committed (due to the "read committed" isolation level for the database transaction). Hereby, this "read committed" isolation level of the database subsystem is propagated to the files in the file subsystem.

The flow ends in step 295.

FIG. 4 is a flow chart of a method 300 according to the invention during deletion of an existing file. It is understood, that the existing file has a file name and includes a BLOB. The flow starts in step 310, and continues to step 320 that is performed in the database subsystem 30 (see FIG. 1). Step 320 consists of starting a new database transaction. In the case of the method in FIG. 4 the database transaction is the deletion of the combined BLOB name and file name in the database subsystem 30 (see FIG. 1).

In the subsequent step, step 330, the pair consisting of the file name and the BLOB name is deleted in the database subsystem 30 (see FIG. 1).

In the subsequent step, step 340, a check is performed to verify if the steps 320 and 330 were successful. In the affirmative case of the check in step 340, the flow continues to step 350, wherein the database transaction started in step 320 is committed.

This is followed by a "cleanup" step 360, wherein the file that includes the BLOB (and that had the file name related to/associated with the BLOB name) is deleted in the file subsystem 20 (see FIG. 1). Thereby, the system transaction is committed.

However, if the check in step 340 shows that an error has occurred during the above database transaction, it can be rolled back and the steps 330 and 360 are skipped, so that both the relation between the BLOB and the file name in the database and the actual file remain unchanged and the consistency of the data is guaranteed. The flow ends in step 370.

In the case of the method in FIG. 4, the system transaction comprises the deletion, in the database subsystem, of a BLOB name and its related file name and, in the file subsystem, deletion of an existing file arranged to include a BLOB.

It should be noted that the methods 200, 300 for modifying/updating and deleting, respectively, an existing file, typically are preceded by the method 100 for creating a new file (including a BLOB).

Moreover, it should be noted, that the methods 100, 200, 300 described above could comprise further method steps in addition to those described. For example, these methods could be extended to cover the manipulation of multiple BLOBs within a single system transaction by simply repeating steps 130 to 170, the steps 220 to 270 and/or the step 330 one or more times preceded with a single step of starting a database transaction, succeeded by a check whether all previous steps were successful and a subsequent commit of the database transaction in the affirmative case.

The system and method described above uses a mechanism where BLOBs are identified by unique names that in turn are associated with changing file names. This is a specialization of a well-known technique called "indirection". The advantages of the system and method according to the invention are achieved by the combination of the capabilities of a database subsystem and a file subsystem. Hereby, the performance problems encountered by storing BLOBs in a standard database and by modifying BLOBs stored in a file system are solved.

The invention claimed is:

1. A system (10) for managing Binary Large Objects (BLOBs), comprising:
   a controller (70) arranged to control processing of the system (10); and
   a file subsystem (20) arranged to create, store, modify and/or delete files based on including a specified BLOB (50) associated with a unique BLOB name in a specified file (40) in said file subsystem (20), the system (10) characterized in that:
   said system (10) further comprises a database subsystem (30) arranged to ensure that Atomicity, Consistency, Isolation, and Durability (ACID) requirements are met,
   said system (10) is arranged to generate a file name to be associated with said specified file (40), wherein upon modification of a BLOB, the system (10) is arranged to create a new file that includes the modified specified BLOB and has a new file name, and to associate the BLOB name with the new file name in the database subsystem (30),
   wherein said database subsystem (30) is arranged to start a database transaction which, when committed, ensures that ACID requirements are met, said database transaction associating said file name with said unique BLOB, wherein unique BLOB names are associated with changing file names, wherein in the event the database transaction is not committed due to an error, the database system (10) reverts back to associating the file name to the Blob name,
   wherein said association between said filename and said BLOB name is bijective, so that any unique file name is associated with one unique BLOB name and any unique BLOB name is associated with one unique file name.

2. A system (10) according to claim 1, characterized in that the database subsystem (30) is arranged to store, modify, rename and/or delete said association between said file name and said BLOB name.

3. A system (10) according to claim 1, characterized in that said association between said file name and said BLOB name is based on a table (60) in said database subsystem (30) arranged to include a relation between said BLOB name and said file name for each specified file (40) including a specified BLOB (50).

4. A system (10) according to claim 1, characterized in that said file name comprises a globally unique identifier (GUID) and a version index.

5. A system according to claim 4, characterized in that said new file name comprises said globally unique identifier (GUID) and an updated version index.

6. A method (200) of modifying a specified file (40) including a specified BLOB (50) having a BLOB name in a system (10), which system (10) comprises a file subsystem (20) arranged to create, store, modify and/or delete files, said specified BLOB (50) having a BLOB name, the system further comprising a controller (70) arranged to control processing of the system (10), characterized in that the method (200) further comprises the steps of:
   starting a database transaction (210) in a database subsystem (30), that is part of the system (10), the database subsystem (30) arranged to ensure that Atomicity, Consistency, Isolation, and Durability (ACID) requirements are met;
   retrieving (220) the file name for a specified file (40) comprising said specified BLOB (50);
   creating (230-250) a new file name;
   associating (260) the new file name and the BLOB name in the database system;
   modifying the specified BLOB (50) and writing (270) the modified specified BLOB to a new file in the file subsystem (20), where said new file is associated with said new file name;
   checking (280) if all previous steps were successful;
   if the check (280) shows that the previous steps were successful, committing (290) said database transaction; and
   if the check (280) shows that the previous steps were unsuccessful, reverting back to associating the file name and the Blob name in the database system,
   wherein said association between said file name and said BLOB name in the database system is bijective, so that any unique file name is associated with one unique BLOB name and any unique BLOB name is associated with one unique file name, and
   wherein the database subsystem (30) is arranged to store, modify, rename and/or delete said association between said file name and said BLOB name to maintain said bijective relationship within the database.

7. A method (200) according to claim 6, characterized in that said file name comprises a globally unique identifier (GUID) and a version index and said new file name comprises said globally unique identifier (GUID) and an updated version index.

8. A computer program product for modifying a specified file (40) including a specified BLOB (50) having a BLOB name in a system (10), which system (10) comprises a file subsystem (20) arranged to create, store, modify and/or delete files, said specified BLOB (50) having a BLOB name, the system further comprising a controller (70) arranged to control processing of the system (10), the computer program product comprising at least one non-transitory computer readable storage medium having computer readable program code thereon, the computer readable program code executable on a computer, the computer executable program code comprising:
   starting a database transaction (210) in a database subsystem (30), that is part of the system (10), the database subsystem (30) arranged to ensure that Atomicity, Consistency, Isolation, and Durability (ACID) requirements are met;
   program code retrieving (220) the file name for a specified file (40) comprising said specified BLOB (50);
   program code creating (230-250) a new file name;
   program code associating (260) the new file name and the BLOB name in the database system;
   program code modifying the specified BLOB (50) and writing (270) the modified specified BLOB to a new file in the file subsystem (20), where said new file is associated with said new file name;
   program code checking (280) if all previous steps were successful;

program code that if the check (280) shows that the previous steps were successful, committing (290) said database transaction, and program code that if the check (280) shows that the previous steps were unsuccessful, reverting back to associating the file name and the Blob name in the database system, wherein said association between said file name and said BLOB name in the database system is bijective, so that any unique file name is associated with one unique BLOB name and any unique BLOB name is associated with one unique file name, and wherein the database subsystem (30) is arranged to store, modify, rename and/or delete said association between said file name and said BLOB name to maintain said bijective relationship within the database.

\* \* \* \* \*